(12) United States Patent
McGrade

(10) Patent No.: US 7,789,044 B2
(45) Date of Patent: Sep. 7, 2010

(54) SELF-TENSIONING, LEVEL FOLDING, COLLAPSIBLE, PET ENCLOSURE AND CARRIER

(76) Inventor: Michael Patrick McGrade, 2953 S. Citrus Ave., West Covina, CA (US) 91791

( * ) Notice: Subject to any disclaimer, the term of this patent is extended or adjusted under 35 U.S.C. 154(b) by 116 days.

(21) Appl. No.: 12/313,533

(22) Filed: Nov. 21, 2008

(65) Prior Publication Data

US 2010/0126427 A1 May 27, 2010

(51) Int. Cl.
*A01K 1/03* (2006.01)
(52) U.S. Cl. .................................... 119/496; 119/498
(58) Field of Classification Search ......... 119/496–499, 119/453, 474, 461; 135/143, 144, 148–150, 135/151, 153, 128, 137, 909, 114; 220/9.2, 220/9.3; 190/107, 24
See application file for complete search history.

(56) References Cited

U.S. PATENT DOCUMENTS

| | | | | |
|---|---|---|---|---|
| 866,335 | A * | 9/1907 | Cook | 135/114 |
| 4,803,951 | A * | 2/1989 | Davis | 119/497 |
| 6,276,548 | B1 * | 8/2001 | Mitchell | 220/9.4 |
| 6,446,577 | B1 * | 9/2002 | Salahor | 119/497 |
| 6,866,009 | B2 * | 3/2005 | Smith et al. | 119/840 |
| 7,044,083 | B2 | 5/2006 | Farmer | |
| 2009/0071781 | A1 * | 3/2009 | Lee | 190/107 |

* cited by examiner

*Primary Examiner*—Rob Swiatek
*Assistant Examiner*—Ebony Evans
(74) *Attorney, Agent, or Firm*—Mark S. Hubert

(57) ABSTRACT

A level folding enclosure is provided for the secure containment and transport of a household pet. Self-tensioning, self-guided, frame members allow for the easy and taut assembly of the rigid support frame. Level folding allows for easy storage and transport when not in use. The frame is assembled and used within a machine washable fabric cover. Tent-style stake peg loops on the exterior corners of the cover and zipper locks ensure the pet's safety and well being. The fabric cover includes numerous pockets and retention devices for the storage of pet supplies. Access to the enclosed pet is possible through three sides of the six sided enclosure. For convenience a carrying case is provided.

10 Claims, 13 Drawing Sheets

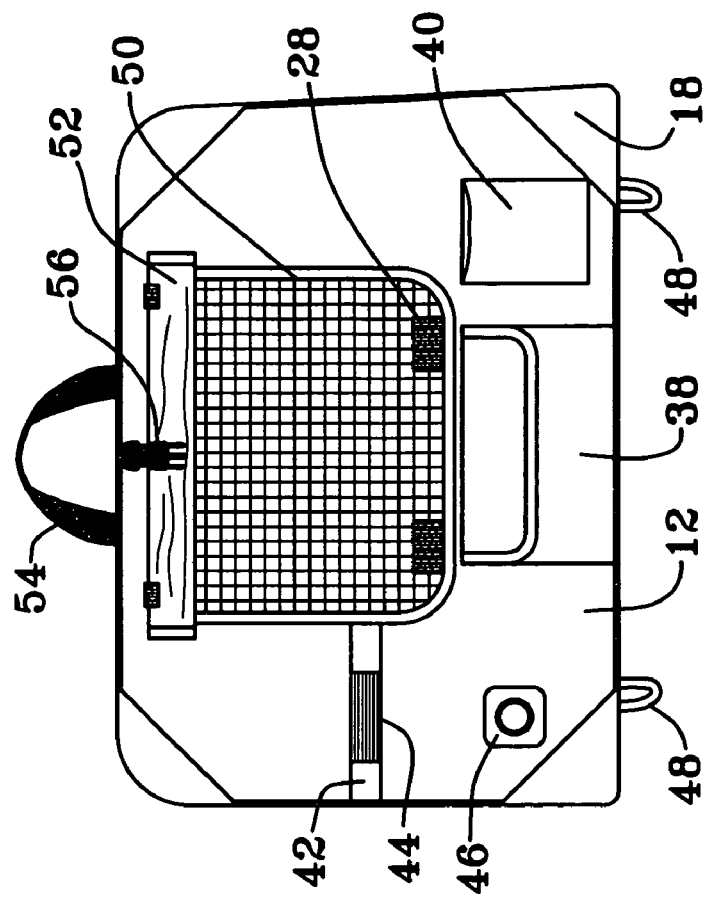
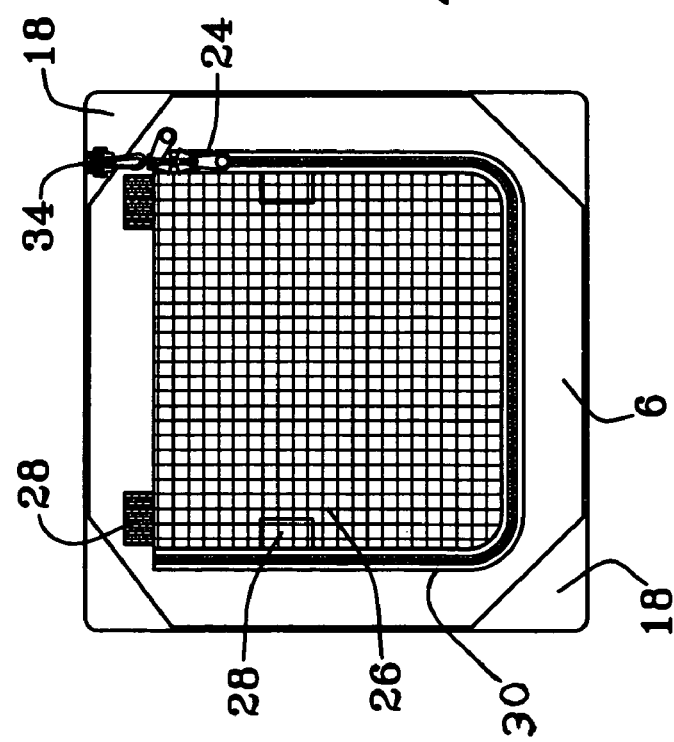
FIG. 5
FIG. 4

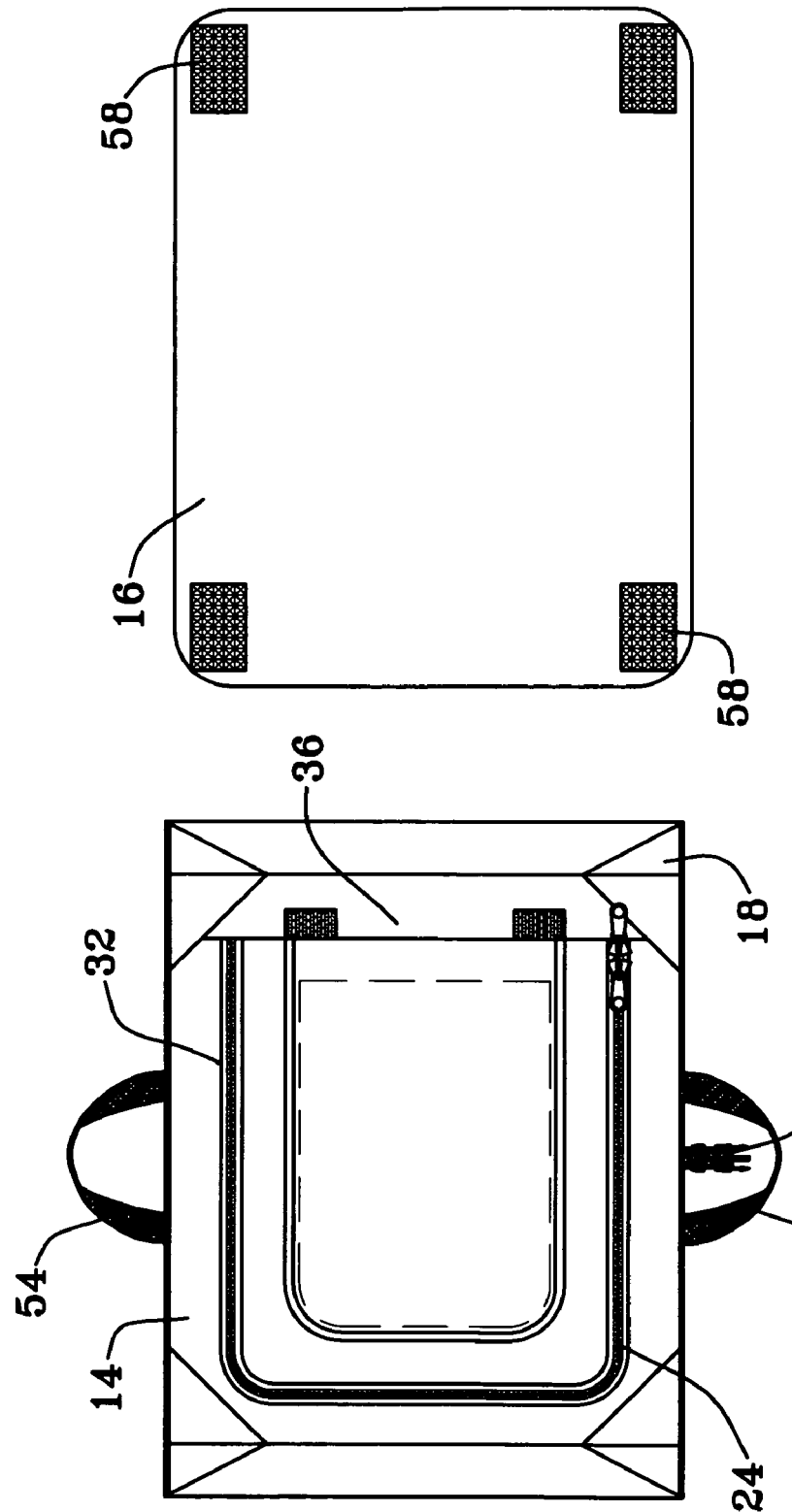

SELF-TENSIONING, LEVEL FOLDING, COLLAPSIBLE, PET ENCLOSURE AND CARRIER

FIELD OF THE INVENTION

The present invention relates to a collapsible pet enclosure and carrier and more specifically to a self-tensioning, level folding pet enclosure and carrier.

BACKGROUND OF THE INVENTION

People love pets. From personal protection to companionship, pets play an important role, in what is reported to be, more than half the households in America. In fact, often pet owners consider their pet part of the family. This devotion to the family pet, had led to an increase in pet travel; owners are simply demanding that their pets can travel with them, whether it be to the neighbor's house or on the family vacation. Unfortunately, many existing, non-collapsible pet enclosures and carriers are large, heavy, and cumbersome.

Existing portable pet carriers have multiple parts and are difficult to assemble efficiently. Typically, a rigid frame resides within a ballistic nylon cover. The nylon has very little give, so assembling the frame within the nylon cover can be difficult, requiring significant force. Additionally, in their collapsed state, existing pet enclosures fold to an uneven, awkward shape, making storage inconvenient, and adding an increased risk of damage, with supporting frame members left vulnerable. Also common in previous designs, is the joining of two support members mid-way between a span. This design creates a structurally weak point should a load be applied to the support members, creating a possible dangerous situation for the pet inside.

Therefore, there exists a need for a self-tensioning, level folding, collapsible pet enclosure and carrier. Not only should the pet carrier be comfortable for the enclosed pet, it also needs to safely accommodate the enclosed pet, and be convenient for the owner. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a collapsible pet enclosure for the containment and transport of a pet. The collapsible enclosure and carrier is easy to assemble with self-tensioning, self-guided frame members and rounded trapezoidal side trusses that provide a very structurally secure frame. Support members are of a unitary construction, and fold to a level configuration for ease of storage. The frame is enclosed within and supports a removable fabric cover. The fabric cover is easily removed and machine washable. Additionally, the fabric cover has numerous removable flaps that, upon removal of these flaps, a woven mesh is revealed. The woven mesh serves to both ventilate the enclosure and allow the pet to see out and as well as the owner to see in. Numerous pockets and retention devices are also provided on the cover for pet accessories, along with a carrying case for transport of the collapsed carrier.

For the pet's safety, zipper clips are provided to lock zippers in their closed position in order to prevent the pet's escape, and anti-tip stake loops are fashioned along the bottom panel to allow the pet enclosure and carrier to be secured to the ground. Once staked to the ground, the enclosed pet will not be able to tip the enclosure.

It has many of the advantages mentioned heretofore and many novel features that result in a new pet enclosure which is not anticipated, rendered obvious, suggested, or even implied by any of the prior art, either alone or in any combination thereof.

In accordance with the invention, an object of the present invention is to provide a collapsible, pet enclosure and carrier that includes self-tensioning, self-guided frame members, which allows for ease of assembly.

It is another object of this invention to provide a structurally sound, collapsible pet enclosure and carrier with unitary support members and rounded trapezoidal support trusses capable of providing secure containment of a pet.

It is a further object of this invention to provide a level folding, collapsible, pet enclosure and carrier allowing convenient storage, and minimizing risk of damage to integral parts.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 4 is a front view of the present invention;

FIG. 5 is a right side view of the present invention illustrating the woven ventilating mesh when the fabric flap is open;

FIG. 8 is a top view of the present invention illustrating the closed position of the fabric flap;

FIG. 9 is a bottom view of the present invention;

DETAILED DESCRIPTION

Figure 1:
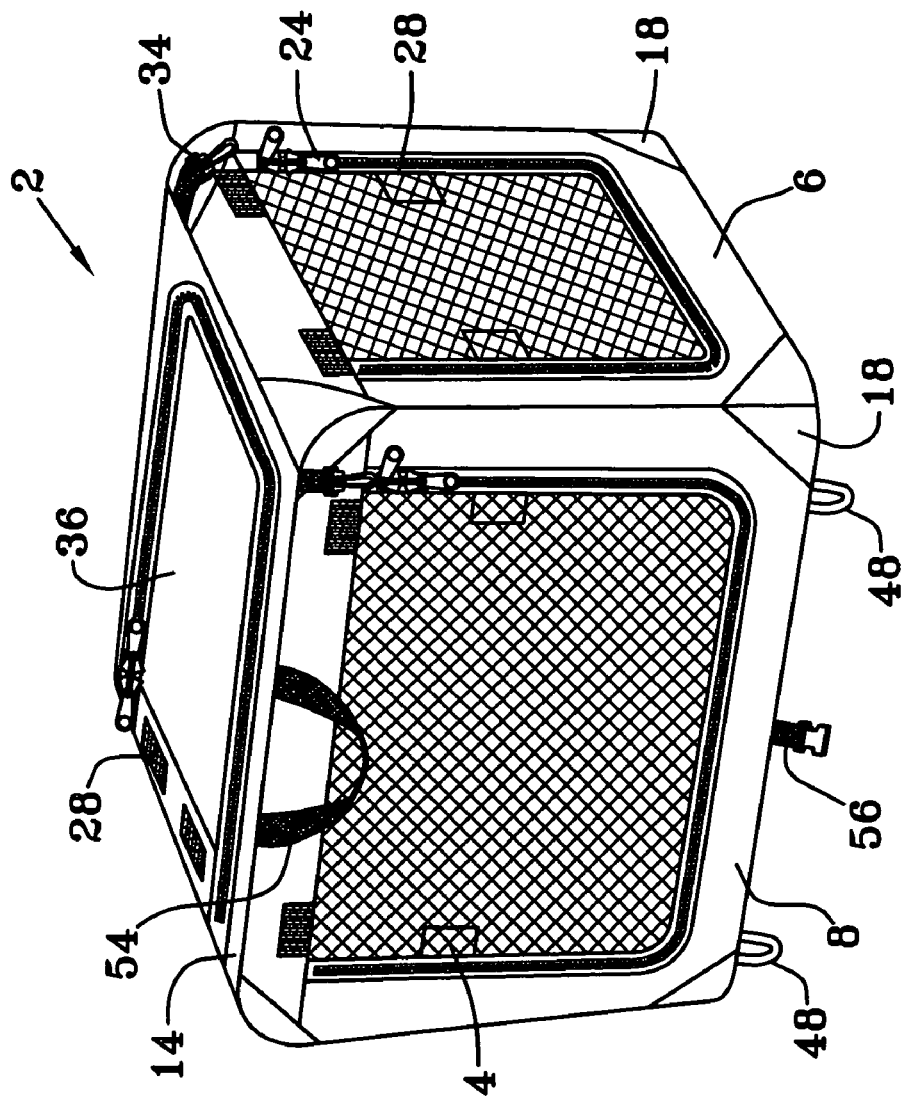
FIG. 1 is a left side perspective view of the present invention.
Figure 3:
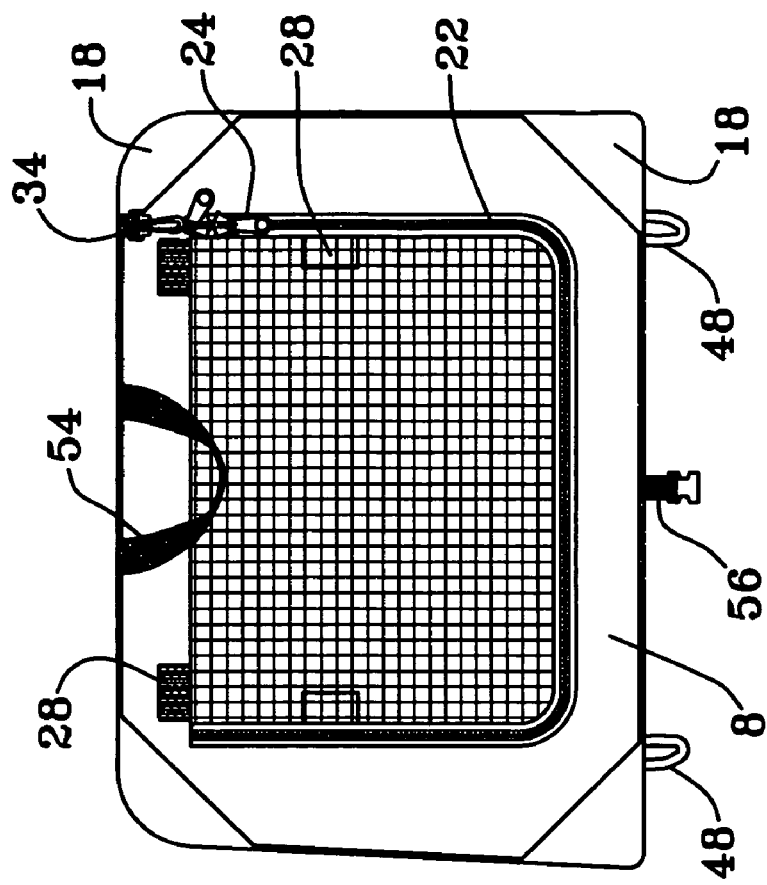
FIG. 3 is a left side view of the present invention.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Looking at FIGS. 1-9 the present invention, a soft crate pet enclosure and carrier 2 comprises a washable, synthetic fabric, cover 4, preferably made of ballistic nylon. In its assembled or use-position the pet enclosure 2 is in a generally rectangular box configuration with a front panel 6, a first side panel 8, a rear panel 10, a second side panel 12, a top panels 14, and a bottom panel 16. Each corner of fabric cover 4 is reinforced with an additional fabric patch 18, such that a patch 18, resides at the vertex of any three panels of pet enclosure 2.

Figure 2:
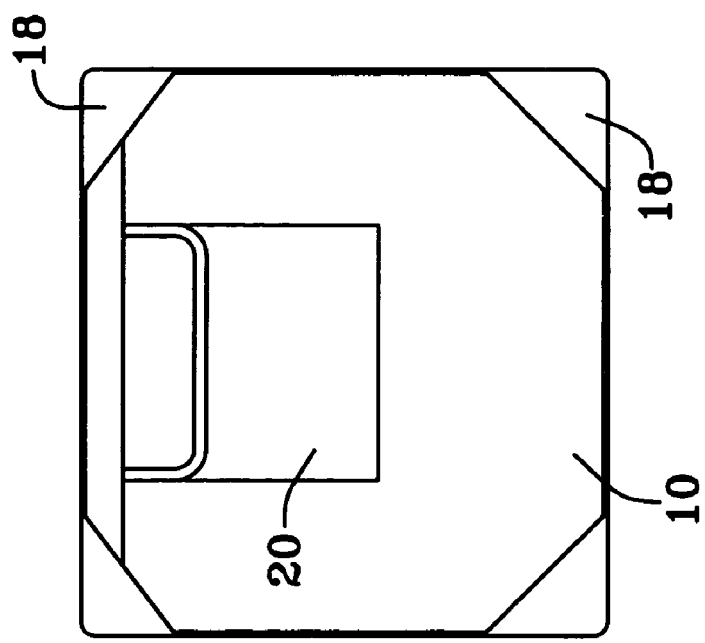
FIG. 2 is a back view of the present invention.

Looking at FIG. 2 it can be seen that rear panel 10 includes a first pocket 20, which is useful for holding personal items and pet accessories.

Access to the interior of pet enclosure and carrier 2, is available through front panel 6, first side panel 8, and top panel 14 through three recloseable openings. Illustrated in FIG. 3, a first recloseable opening 22 is centrally located on first side panel 8, such that each edge of the first recloseable opening 22 is bordered by a strip of fabric cover 4. First recloseable opening 22 is stitchedly affixed along a single edge to fabric cover 4 and releasably affixed to fabric cover 4 via a zipper 24 along its remaining edges. First recloseable opening 22 is comprised of woven ventilating mesh 26, which not only aids in the ventilation of pet enclosure and carrier 2, but also allows the enclosed pet to see out of pet enclosure and carrier 2 while allowing the owner or keeper to view the enclosed pet. In the present invention a hook-and-loop fastener 28 is employed to secure the woven ventilating mesh 26, once it as been unzipped. One portion (i.e., either the hook or loop) of the hook-and-loop fastener resides on fabric cover 4, along the single, stitchedly attached edge of first recloseable opening 22, while its matingly engageable counterpart resides along the interior of woven ventilating mesh 26. This configuration allows for the woven ventilating mesh 26 to be rolled-up (once unzipped) and secured along the single stitchedly attached edge of first recloseable opening 22. In addition to the first recloseable opening 22, a second recloseable opening 30 is located on front panel 6 (See FIG. 4) and a third recloseable opening 32 is located on top panel 14 (See FIG. 7). The second recloseable opening 30 is attached and employed with the above described configuration.

Often, friskier pets can pry open zippers from inside a pet enclosure. For convenience and safety, zipper retention clips 34 are provided both on front panel 6 and first side panel 8. The pull tab portion of zipper 24 has an orifice there through so that it can be enclosed with the retention clips thereby making unzipping of first recloseable opening 22 and second recloseable opening 30 impossible.

Third recloseable opening 32 (FIGS. 7 and 8) has a first fabric flap 36, covering the woven ventilating mesh 26. First fabric flap 36 is stitchedly attached along a single edge to fabric cover 4, and secured to the ventilating mesh 26 via a hook-and-loop fastener 28. One portion (i.e., either the hook or loop) of the hook-and-loop fastener resides on the inside surface of fabric cover 36, while its matingly engageable counterpart resides along ventilating mesh 26. Additionally, another matingly engageable hook-and-loop fastener 28 resides on fabric cover 4 along the stitchedly attached edge of first fabric flap 36. This configuration allows for the first fabric flap 36 to be rolled-up (once unfastened from woven ventilating mesh 26) and secured along the single stitchedly attached edge of third recloseable opening 32. Third recloseable opening 32 is unlike first recloseable opening 22 and second recloseable opening 30 in that woven mesh 26 cannot be rolled up and secured along the single stitchedly attached edge of third recloseable opening 32. Handles 54 are stitchedly affixed to top panel 14 to facilitate carrying of pet enclosure and carrier 2.

Figure 6:
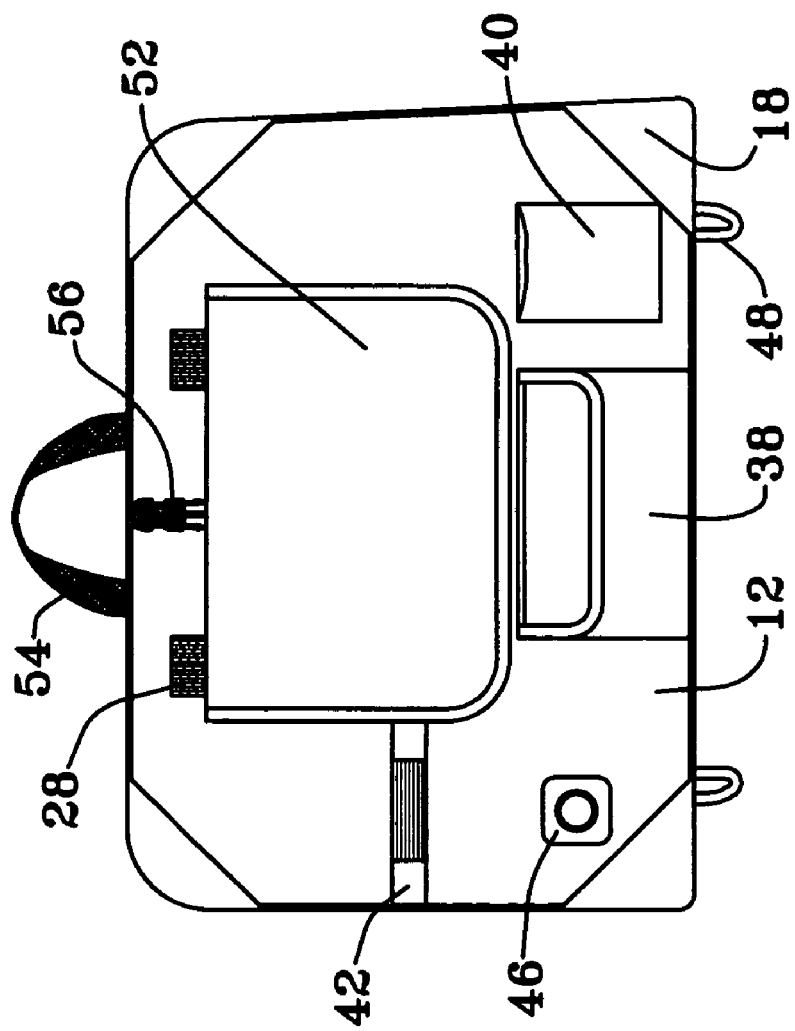
FIG. 6 is a right side view of the present invention illustrating the closed position of the fabric flap.
Figure 7:
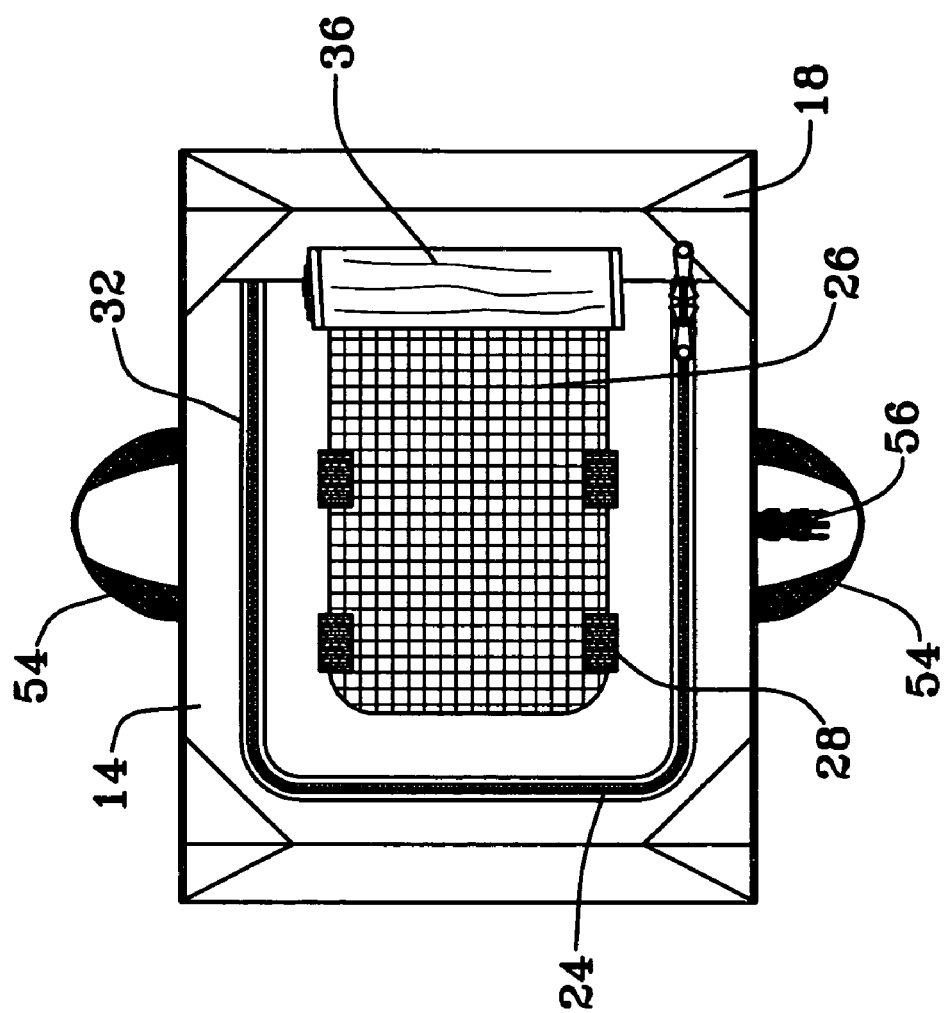
FIG. 7 is a top view of the present invention illustrating the woven ventilating mesh when the fabric flap is open.

Looking a FIGS. 5-6, second side panel 12 can be seen. Second side panel 12 is designed for the pet owner's or keeper's convenience. A second pocket 38 can also be seen. Like first pocket 20, second pocket 38 is ideal for pet accessories or personal items. A pouch 40 is also visible, ideal for the storage of larger items such as a pet brush or water bottle. For even larger items an elastic retention strap 42 is also provided. Retention strap 42 is stitchedly affixed only at its two ends. Since retention strap 42 has an elastic portion 44 large items can be securely held within retention strap 42 as is well know in the art.

An orifice 46 reinforced with a grommet is also visible. Orifice 46 allows for an enclosed pet's leash to be secured outside of the pet enclosure and carrier 2, without opening the pet enclosure and carrier 2. The leash is simply threaded through the orifice 46 and secured to any suitable object outside of pet carrier and enclosure 2.

Also visible on second side panel 12 and first side panel 8 are retention loops 48. In the present invention two retention loops reside along the edge where first side panel 8 and bottom panel 16 meet, and two additional retention loops 48 reside along the edge where second side panel 12 and bottom panel 16 meet. These four retention loops are designed to receive stakes thereby securing the pet enclosure and carrier 2 firmly to the ground. This is ideal for outdoor pet competitions or even camping.

Visible in FIG. 5 is a window 50, comprised of woven ventilation mesh 26. Window 50 is stitchedly attached along all its edges to fabric cover 4. Window 50 has a second fabric flap 52, covering the woven ventilating mesh 26 and secured to the ventilating mesh 26 via a hook-and-loop fastener 28. One portion (i.e., either the hook or loop) of the hook-and-loop fastener resides on the inside surface of second fabric flap 52, while its matingly engageable counterpart resides along ventilating mesh 26. Additionally, another matingly engageable hook-and-loop fastener resides on fabric cover 4 along the stitchedly attached edge of second fabric flap 52. This configuration allows for the second fabric flap 52 to be rolled-up (once unfastened) and secured along one stitchedly attached edge of window 50. It should be noted that the combination of recloseable openings, windows, and fabric flaps, could be employed in any number of varying configurations.

Looking at FIG. 9, bottom panel 16 is visible. Located at each corner of bottom panel 16 is a traction pad 58 designed to increase both the coefficient of static and kinetic friction between bottom panel 16 and whatever surface it contacts.

Figure 16:
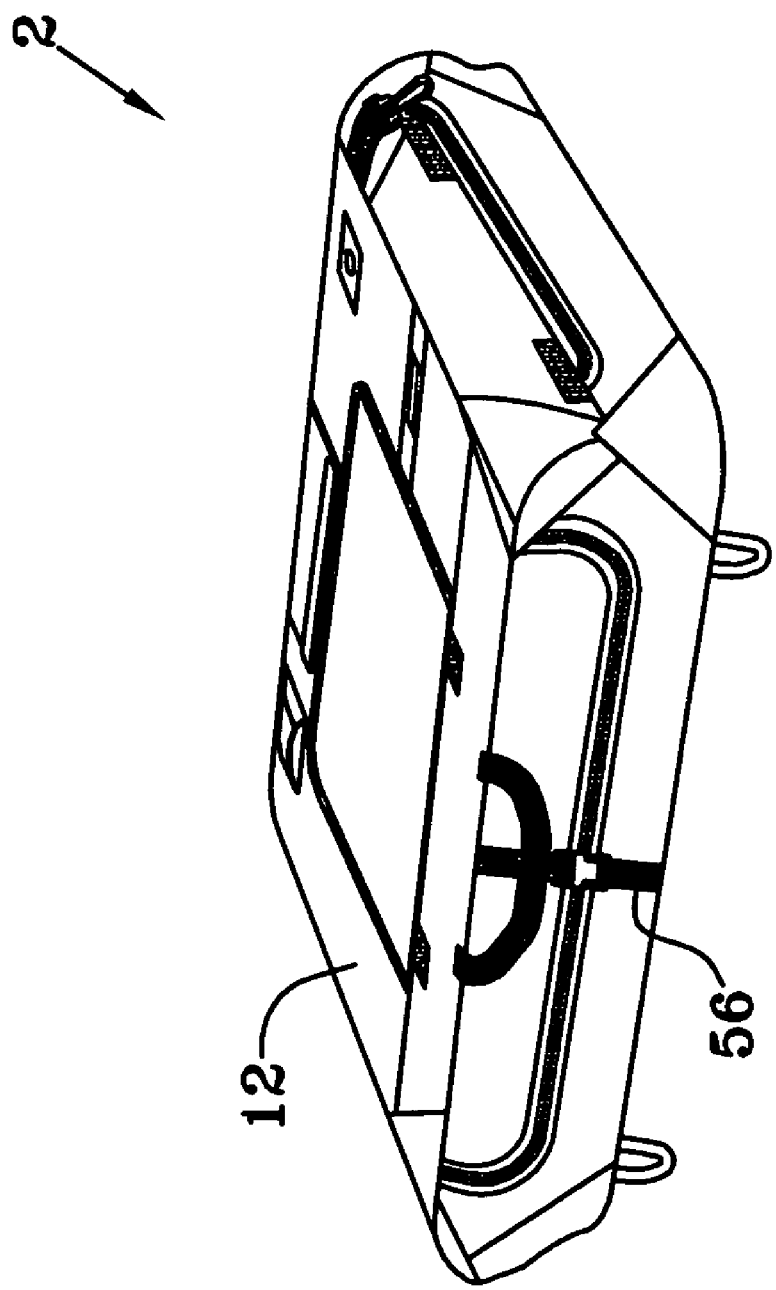
FIG. 16 is a side perspective view of the present invention in its collapsed state.

Since pet enclosure and carrier 2 is collapsible, a side release buckle assembly 56 is provided. One half of buckle assembly 56 resides on top panel 14 with it's matingly engageable counterpart residing on first side panel 8 such that when pet enclosure and carrier 2 is in its collapsed state, buckle assembly 56 can be employed to releasably lock pet enclosure and carrier 2 in its collapsed configuration (See FIG. 16).

Figure 10:
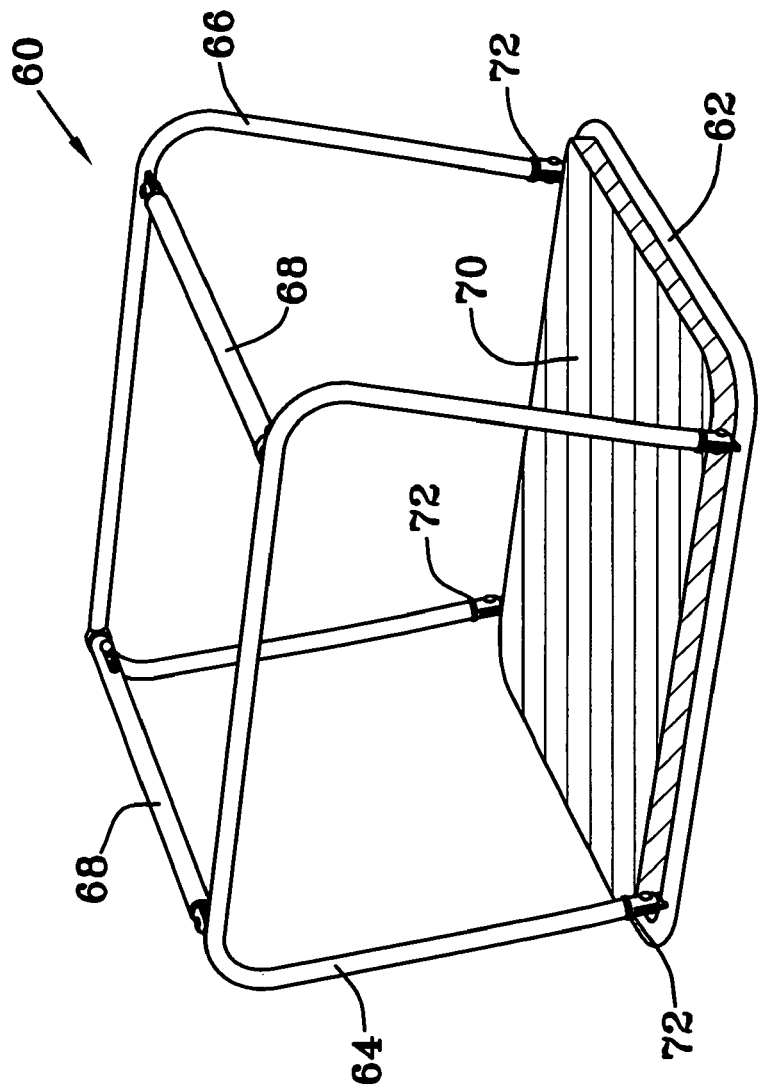
FIG. 10 is a side perspective view of the rigid frame (fabric cover omitted) and the cushioning comfort pad.
Figure 11:
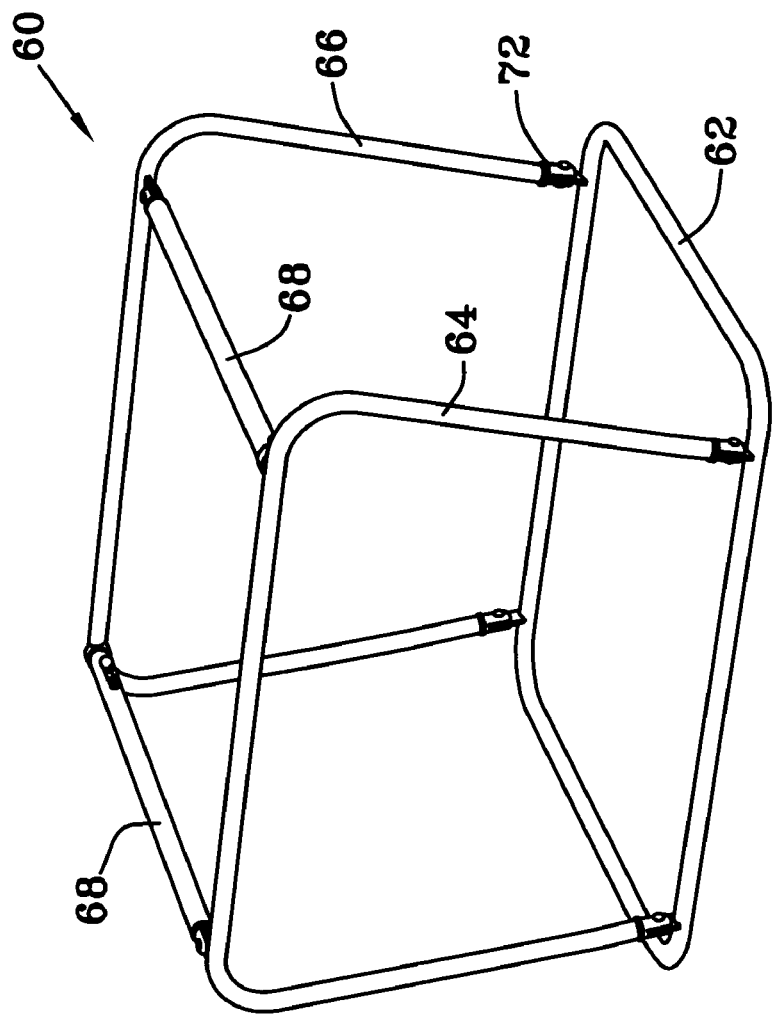
FIG. 11 is a side perspective view of only the rigid frame.
Figure 12:
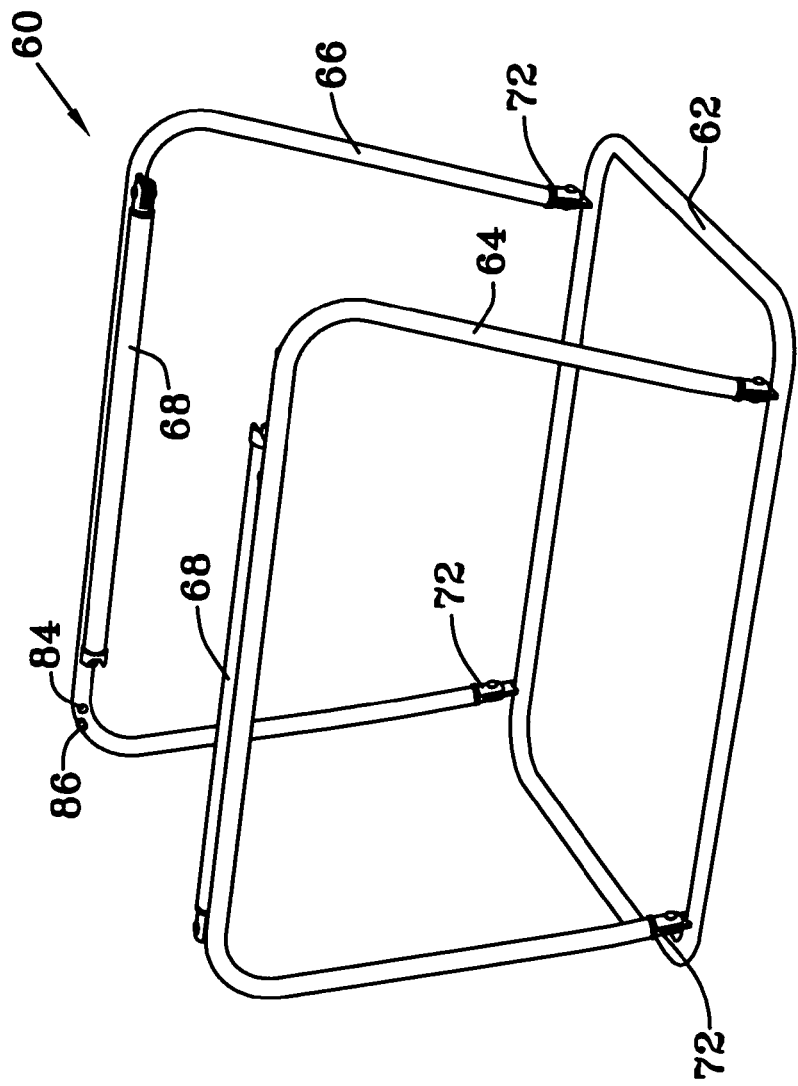
FIG. 12 is a side perspective view of the rigid frame illustrating the self-tensioning strut members in their unlocked position.
Figure 13:
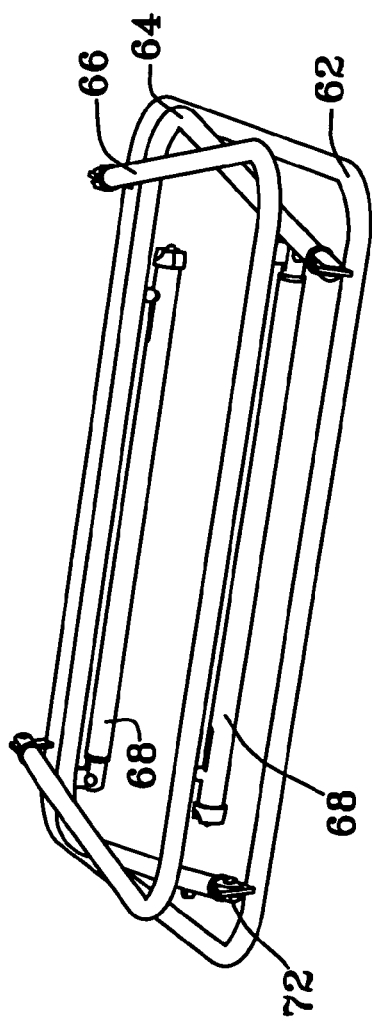
FIG. 13 is a side elevation view illustrating the rigid frame in its folded position.
Figure 14:
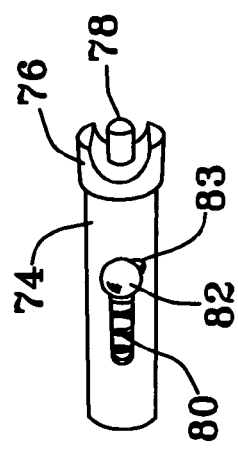
FIG. 14 is a side view of the locking guide.

FIGS. 10-15 illustrate the rigid frame that is enclosed within fabric cover 4. The rigid frame 60 is comprised of substantially rectangular floor member 62, first side truss 64, second side truss 66, and two strut members 68 extending between side trusses 64 and 66. In the present invention the rigid frame 60 is made of a lightweight metal tubes of a circular cross-section. Illustrated in FIG. 10, is a removable cushion 70 designed for the pet's comfort. FIG. 11 illustrates rigid frame 60 without the removable cushion 70.

First side truss 64 and second side truss 66 are substantially similar in shape and comprised of a singular tube, bent in two spots, so that each side truss is three-sided. The shape of trusses 64 and 66 could roughly be described as trapezoidal, or having that of the profile of a flat-bottomed teardrop, in that the open-ended sides of trusses 64 and 66 do not reside parallel to one another. The open ends of side trusses are hingedly affixed to floor member 62 via simple hinged assemblies 72 as are well known in the art.

To allow for level folding of frame 60, hinge assemblies 72 should be longer on second side truss 66. This allows for first side truss 64 to be lowered towards the ground, followed by the lowering of second side truss 66, which will then rest, in a level plane, on top of first side truss 64, thereby reducing the risk of damage to frame and facilitating its storage. When the pet enclosure and carrier 2 is in its folded configuration, it is a uniform, compressed structure; it's not bulkier or heavier on one side.

One strut member 68 is hingedly affixed at a single end to first side truss 64, and one strut member 68 is hingedly affixed at a single end to second side truss 66 via hinge assemblies 72. Each strut member 68 is hingedly affixed at an upper section of the side trusses 64 and 66 such that strut members 68 reside parallel and adjacent to the upper section of side trusses 64 and 66. Each strut member 68 is hingedly affixed to side trusses 64 and 66 at opposite ends of each of the side trusses (See FIG. 12).

Each open end (that is the non-hingedly attached end) of the strut members 68 terminates in a locking guide 74. Looking at FIG. 14 it can be seen that the locking guide 74 comprises a concave lip 76, spring-loaded retractable pin 78, spring 80, locking button 82 and a L-shaped track 83. The design of the locking guide 74 makes assembly of the the pet enclosure and carrier 2 extremely quick and effortless.

To assemble pet enclosure and carrier 2, rigid frame 40 is placed within fabric cover 4, such that floor member 62 resides on floor panel 16. Second side truss 66 is pivoted up (away from the floor member 62) at approximately a 90° angle. Then, first side truss 64 is pivoted up (away from the floor member 62) at approximately a 90° angle. Each strut member 68 is then pivoted away from its attached side truss 64 or 66 towards the opposing side truss 64 or 66. The pivoting of the strut members 68 does not have to occur simultaneously; it can occur in succession. As strut member 68, which is hingedly affixed to first side truss 64 is moved away from first side truss 64 towards side truss 66, locking button 82 is depressed such that retractable pin 78, is retracted within locking guide 74. Concave lip 76 is C-shaped, designed to matingly engage the tubular form of second side truss 66, such that once concave lip 76 contacts second side truss 66, it self-guides along second side truss 66, until an orifice 84 is reached. Concave lip 76 easily slides along the tubular form of second side truss 66 because in the present invention it is formed from high density polymer with a low coefficient of friction. Orifice 84 is designed to matingly engage retractable pin 78, and is located at a position on second side truss 66 directly opposite the hinged assembly 72 attaching strut member 68 to first side truss 64. Concave lip 76 will slide along second side truss until orifice 84 is reached. Locking button 82 is released thereby deploying retractable pin 78 into orifice 84. Strut member 68 is now locked into position, extending between and perpendicular to, first side truss 64 and second side truss 66. To further aid in the self-guiding and self-tensioning aspect of the present invention, a bump-stop 86 resides adjacent to orifice 84, this allows for "blind" assembly of rigid frame 60, within fabric cover 4. The assembler does not have to look for orifice 84; as soon locking guide 74 hits bump-stop 86, the assembler knows orifice 84 is aligned to receive retractable pin 78. The L-shaped track 83 only allows the spring 80 (thereby the retractable pin 78) to be depressed or released when locking button 82 is in the "long leg" portion of the L-shaped track 83. Movement between the "long leg" and the "short leg" is accomplished through a barrel (not visible) which is located within locking guide 74. This barrel allows locking button 82 to rotate or slide within locking guide 74 along L-shaped track 83 as is well known in the art. Once retractable pin 78 is deployed within orifice 84, locking button 82 can be moved to the "short leg" of the L-shaped track 83. Until locking button 82 is moved back to the "long leg" of L-shaped track 83, spring 80, cannot be engaged. This is an additional safety feature, minimizing the chance of locking guide 74 unintentionally disengaging from a side truss. Both strut members 68, regardless of attachment to first side truss 64 or second side truss 66 follow this same scheme for locking engagement.

Figure 15:
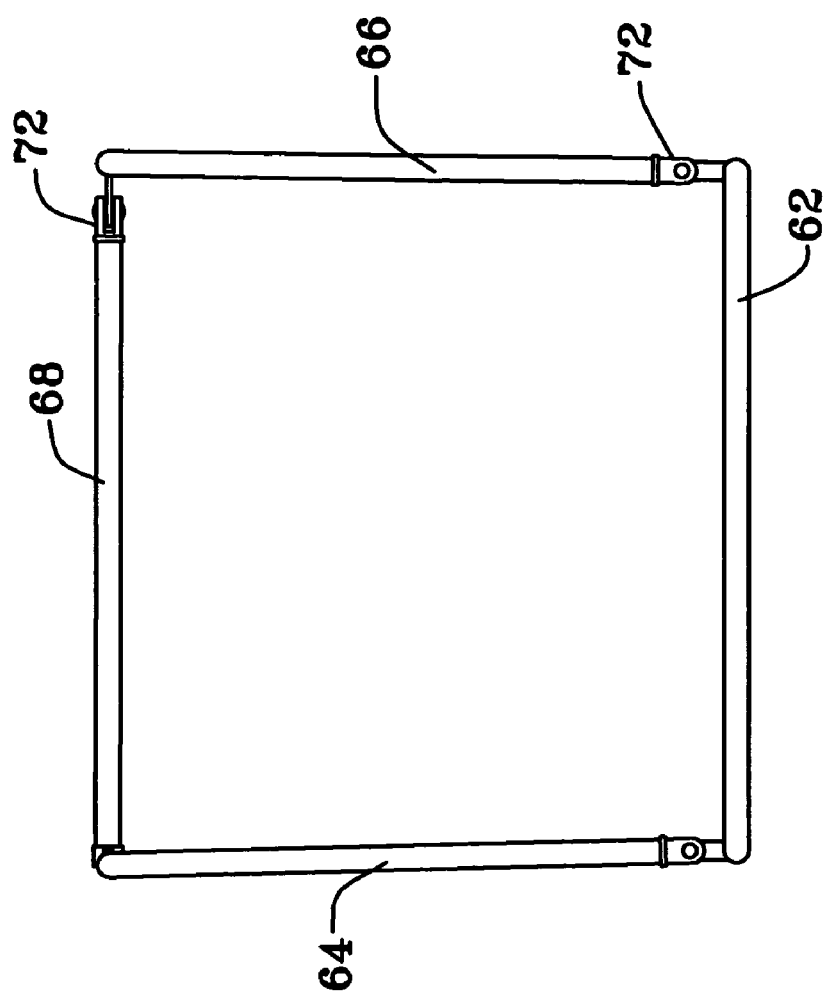
FIG. 15 is a front and back view of the rigid frame.

Referring now to FIG. 15, it can be seen that the angle between floor member 62 and first side truss 64 is greater than 90° as is the angle between floor member 62 and second side truss 66. This is specifically designed to be sufficiently resistant to bending and shear. This design reduces stress along the strut member 68, extending the life of rigid frame 60. This design also allows for the taut fit of fabric cover 4 over rigid frame 60.

Figure 17:
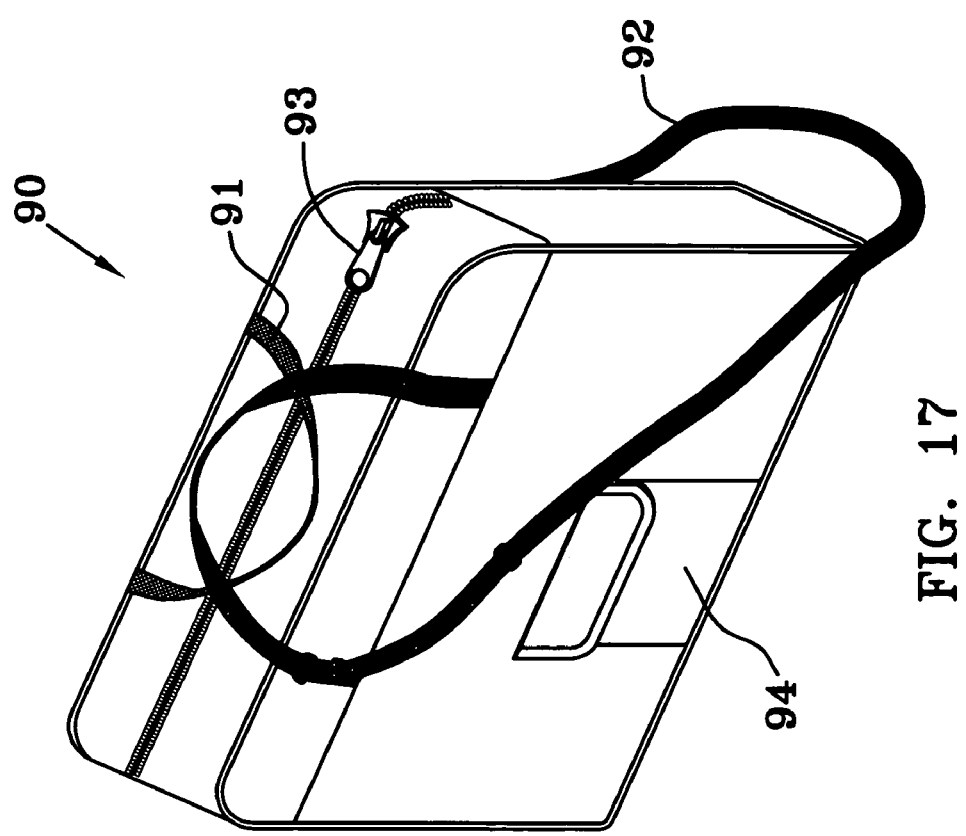
FIG. 17 is a perspective view of the present invention conveniently stored in its carrying case.

For convenience, a carrying case 90 is shown in FIG. 17. In the present invention, carrying case 90, has a zippered opening 93, and both handles 91, and a shoulder strap 92. Also visible is a side pocket 94. Obviously, any combination of pockets or carrying means could be provided without departing from the scope of the invention.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A collapsible pet carrier comprising:
   a tubular base of a first diameter having a first and second long side and a first and second short sides;
   two first pivot assemblies of a first height extending normally from a top face of said first long side;

two second pivot assemblies of a second height different from said first height and extending normally from said top face of said second long side;

a short C-shaped side member with a proximate and distal end having a third pivot assembly extending normally therefrom and adjacent to a first corner, a bump-stop extending normally therefrom and adjacent to a second corner, and an orifice formed therein between said third pivot assembly and said bump-stop and adjacent to said bump-stop, wherein said distal and proximate ends of said short member are pivotally connected to said first pivot assemblies;

a long C-shaped side member with a proximate and distal end having a third pivot assembly extending normally therefrom and adjacent to a first corner, a bump-stop extending normally therefrom and adjacent to a second corner, and an orifice formed therein between said third pivot assembly and said bump-stop and adjacent to said bump-stop, wherein said distal and proximate ends of said long member are pivotally connected to said second pivot assemblies;

a connecting member with a distal end pivotally connected to said third pivot assembly of said long side member, and with a proximal end having a spring loaded retractable pin mechanism therein that extends through a concave polymer tip matingly conformed to said first diameter;

a connecting member with a distal end pivotally connected to said third pivot assembly of said short side member, and with a proximal end having a spring loaded retractable pin mechanism therein that extends through a concave polymer tip matingly conformed to said first diameter; and an external fabric cover sized for taut engagement over said base, said side members and said connecting members;

wherein said connecting members are slidingly engagable along said long and short C-shaped members until abutment with said bump-stop and engagement of said pin mechanism with said orifice.

2. The collapsible pet carrier of claim 1 wherein said height of said first pivot assembly exceeds said height of said second pivot assembly by said first diameter.

3. The collapsible pet carrier of claim 2 wherein said retractable spring loaded pin mechanism has a barrel enclosed within a connecting member and a lockable trigger that extends normally from said barrel through an L-shaped slot in said connecting member.

4. The collapsible pet carrier of claim 3 wherein said first and second pivot assemblies reside directly opposite each other on their respective long sides.

5. The collapsible pet carrier of claim 4 further comprising a washable padded fabric insert sized to fit within said base.

6. The collapsible pet carrier of claim 1 wherein said external fabric cover has zippered door and window panels thereon.

7. The collapsible pet carrier of claim 6 wherein said external fabric cover has zipper locks thereon.

8. The collapsible pet carrier of claim 7 wherein said external fabric cover has sealable pockets thereon.

9. The collapsible pet carrier of claim 8 wherein said external fabric cover has stake loops affixed thereon, adjacent to a perimeter of said base.

10. The collapsible pet carrier of claim 9 wherein said external fabric cover has gripable pads on a bottom surface thereof.

* * * * *